United States Patent [19]

Meyer et al.

[11] Patent Number: 4,917,475

[45] Date of Patent: Apr. 17, 1990

[54] FLEXOELECTRIC LIQUID CRYSTAL DEVICE

[75] Inventors: Robert B. Meyer, Wellesley, Mass.; Jayantilal S. Patel, Scotch Plains, N.J.

[73] Assignee: AT&T Bell Laboratories, Murray Hill, N.J.

[21] Appl. No.: 22,736

[22] Filed: Mar. 6, 1987

[51] Int. Cl.$^4$ .............................................. G02F 1/13
[52] U.S. Cl. ................................ 350/350 R; 350/341; 350/346
[58] Field of Search ........... 350/340, 341, 346, 350 R, 350/350 S

[56] References Cited

U.S. PATENT DOCUMENTS

| | | | |
|---|---|---|---|
| 3,703,331 | 11/1972 | Goldmacher et al. | 350/346 |
| 4,278,328 | 7/1981 | Mukoh et al. | 350/346 |
| 4,333,708 | 6/1982 | Boyd et al. | 350/340 |
| 4,564,266 | 1/1986 | Durand | 350/340 |
| 4,664,480 | 5/1987 | Geary et al. | 350/340 |

OTHER PUBLICATIONS

Raynes, "Cholesteric Texture and Phase Charge Effects", Nonemissive Electrooptic Displays, Ed., Kmetz et al., Plenum Press, NY 1976.

R. B. Meyer, "Piezoelectric Effects in Liquid Crystals", Phy Rev. Lett., vol. 22, pp. 918–921, (1969).

J. S. Patel et al., Ferroelectrics, vol. 59, pp. 137–144, (1984).

Primary Examiner—Stanley D. Miller
Assistant Examiner—Trong Quang Phan
Attorney, Agent, or Firm—Michael J. Urbano

[57] ABSTRACT

A liquid crystal device includes a liquid crystal material (30) in which the molecules (15) form a helix having its axis essentially parallel to the plates (13, 20) of the device. A suitable electric field (E), applied essentially perpendicular to the plates, causes planes of the directors (n) to rotate about the field direction to an acute angle $\phi$ with respect to the helix axis, thereby inducing alternating bands of splay and bend in the material. Such configurations, which have polar symmetry, give rise to the flexoelectric effect in which the polarization (P) of the molecules tends to be parallel to the applied field, and the magnitude of the field is linearly related to tan $\phi$. The ability to rotate the directors means that the optical properties of the material can be changed.

9 Claims, 5 Drawing Sheets

FLEXOELECTRIC LIQUID CRYSTAL DEVICE

BACKGROUND OF THE INVENTION

This invention relates to liquid crystal (LC) devices and, more particularly, to such devices which exhibit the flexoelectric effect.

The flexoelectric effect is exhibited by LC molecules which form structures that have polar symmetry; for example, geometric configurations characterized by splay (FIGS. 1-2) and/or bend (FIGS. 3-4) deformations. The effect has two forms, similar to the piezoelectric effect. Either an electric polarization $\overline{P}$ induces splay or bend curvature, or, vice versa, the curvature induces an electric polarization. this invention relates to the first form; an applied electric field $\overline{E}$ induces polarization $\overline{P}$ which in turn induces curvature (FIGS. 1-4). Reversing the sign of the electric field likewise reverses the direction of $\overline{P}$ and of the curvature (FIG. 1 vs. FIG. 2; FIG. 3 vs. FIG. 4) since the two are related in a polar fashion.

An applied electric field also induces parallel molecular alignment due to the coupling to the dielectric anisotropy. If the dielectric anisotropy is too large, the flexoelectric effect induced by an applied electric field may not be observed.

The first proposal of the flexoelectric effect was made by R. B. Meyer in *Phy. Rev. Lett.*, Vol. 22, p. 918 (1969). In an ordinary nematic LC material, which is initially uniformly aligned, he proposed that a uniform electric field would induce the formation of a continuously rotating (not in time, but in space) director structure having alternating bands of splay and bend deformation of the type shown in FIG. 2 of the article. However, the formation of such a structure from a uniformly aligned nematic has never been observed for two reasons. First, the flexoelectric effect must compete with ordinary dielectric anisotropy, and the latter coupling usually dominates, maintaining uniform orientation (i.e., molecules lined up with $\overline{E}$). Second, the continuously rotating director pattern would have to be formed by the generation of a periodic array of disclination line defects near the electrode surfaces and at the centers of the splay bands. However, these defects would occur most easily with high static fields which undesirably may induce electrohydrodynamic instabilities that tend to obscure the splay-bend structure.

On the other hand, the only proposal of the flexoelectric effect in cholesteric or chiral nematic LC materials is found in U.S. Pat. No. 4,564,266 granted to G. E. A. Durand on Jan. 14, 1986. However, in Durand the molecules are oriented so as to form a curved segment 3 which may be viewed as having an axis along the Oy direction parallel to the plates 1 and 2 (FIG. 2) but perpendicular to the electrodes on the front and rear walls of cell 10 (col. 8, lines 40-43). Consequently, the axis is also perpendicular to the direction of light L and parallel to the direction of the electric field E. In addition, Durand's LC material does not contain periodic bands of splay and bend.

SUMMARY OF THE INVENTION

In accordance with one aspect of the invention, it has been found that the flexoelectric effect can be induced in LC materials having chiral centers (e.g., cholesterics, chiral nematics) by causing the helix axis of the LC material to align itself essentially parallel to the plates of a cell incorporating the material. An electric field, applied perpendicular to the plates, causes the planes of the directors to rotate about the field direction to an acute angle $\phi$ with respect to the helix axis, thereby inducing alternating (e.g., periodic) bands of splay and bend in the material. The magnitude of the applied field is maintained low enough that the coupling to the dielectric anisotropy does not unwind the cholesteric helix and cause the molecules to line up with the field.

Advantageously, in the invention periodic disclinations are inherently formed at locations which are near the surface of the plates and where the directors in the bulk are orthogonal to those at the surfaces. Thus, the relatively high fields of Meyer, supra, are not required. Instead, operation at much lower fields is achieved because the field needs only to deform the molecular structure to produce splay and bend.

In accordance with another aspect of the invention, the flexoelectric effect may be induced in LC materials by applying an essentially uniform field across the plates and by providing suitable aligning layers on the plates which induce alternating (e.g., periodic) band of splay and bend in the LC material.

In either case, the ability to rotate the directors of the molecules means that the optical properties of the material can be changed. Thus, the invention may find use in a number of applications including, for example, optical modulators, optical gratings, or liquid crystal displays.

BRIEF DESCRIPTION OF THE DRAWING

The invention, together with its various features and advantages, can be readily understood from the following more detailed description taken in conjunction with accompanying drawing, in which:

in FIGS. 7 and 9 an electric field perpendicular to the plates causes the plane of the directors to rotate to an orientation which is at an angle $\pm\phi$ to the helix axis depending on the polarity of $\overline{E}$ across the plates; in FIG. 8, E=0 and the directors are perpendicular to the helix axis.

For simplicity of illustration, FIGS. 7-11 show ideal periodic ordering of the molecules. In reality, however, such ideality is not observed. Thus, within each x-y plane, for example, the directors exhibit orientational order but not positional order.

DETAILED DESCRIPTION

Figure 1:
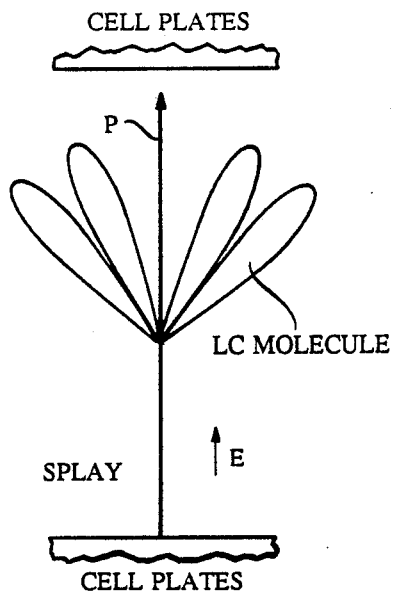
FIGS. 1-2 are schematic representations of LC molecules which exhibit a deformation known as splay.
Figure 2:
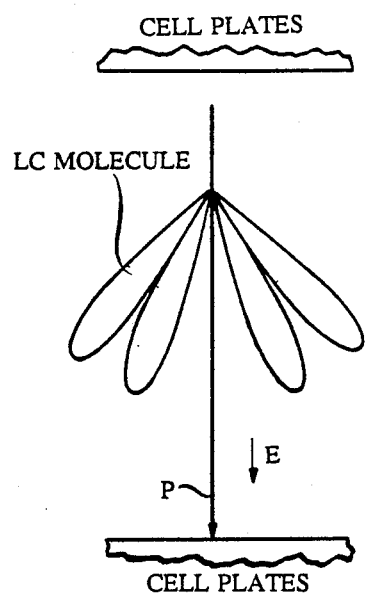
Figure 3:
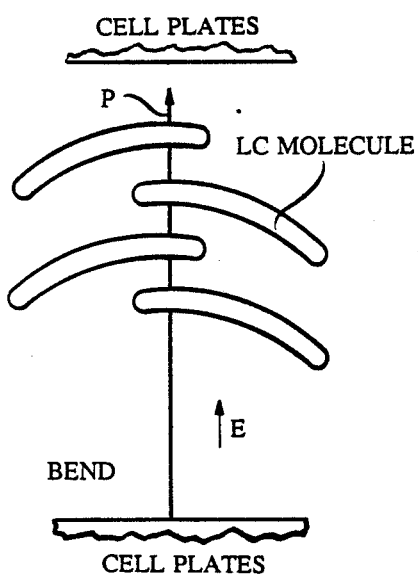
FIGS. 3-4 are schematic representations of LC molecules which exhibit a deformation known as bend.
Figure 4:
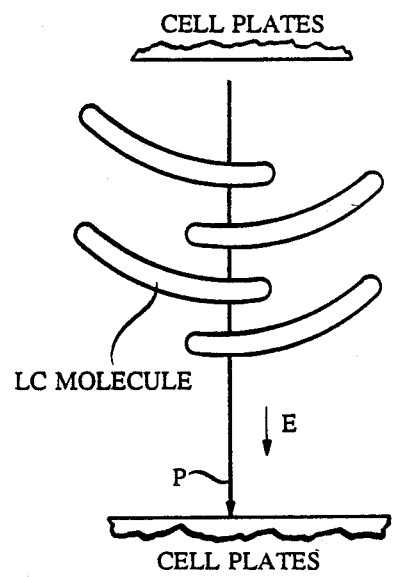
Figure 5:
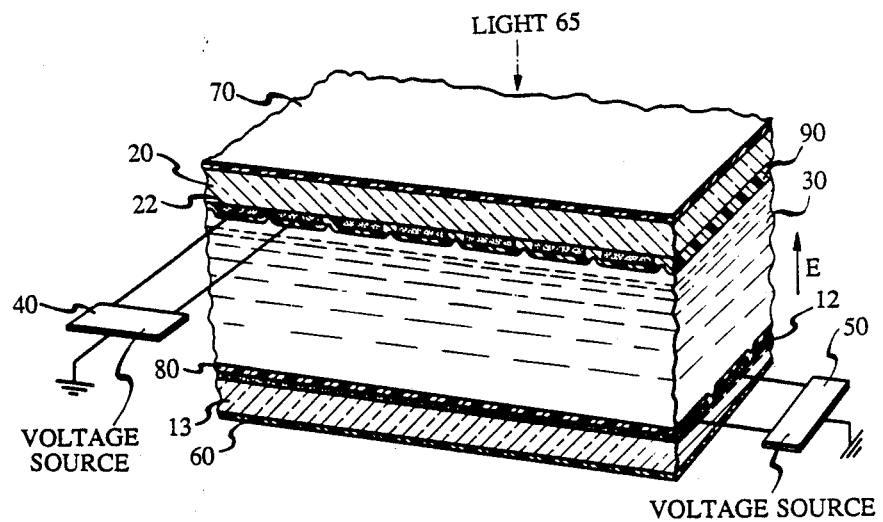
FIG. 5 is a schematic, isometric view of a LC device.
Figure 6:
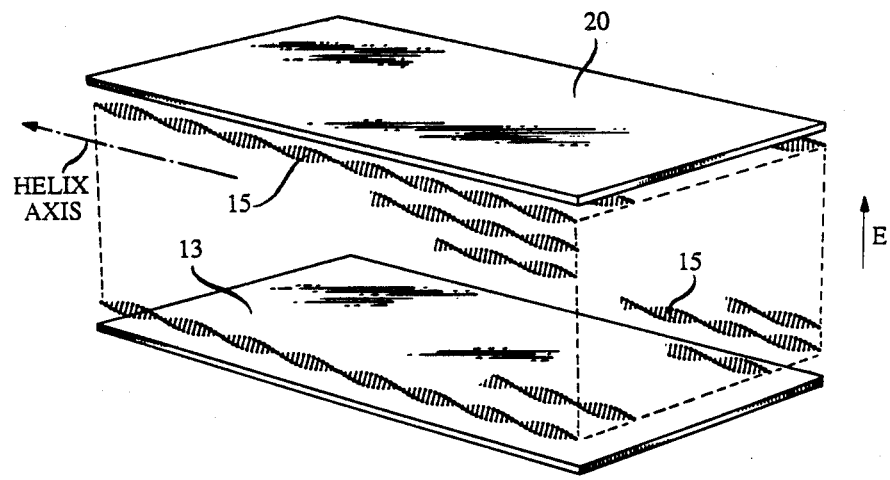
FIG. 6 is a schematic, isometric view of the salient features of a flexoelectric LC device in accordance with one embodiment of the invention.

With reference now to FIGS. 5-6, there is shown a schematic, isometric view of a portion of a liquid crystal (LC) device. The cell includes confinement means such as a pair of essentially parallel plates 13 and 20 which bound, for example, a cholesteric or chiral nematic LC material 30 therebetween. In one embodiment the molecules 15 (FIG. 6) of the material are chiral and are arranged in a helical fashion with the helix axis essentially parallel to the plates. The LC material may include a single constitutent or a plurality of such constituents, one or more of which should be chiral in symmetry. The plates 13 and 20, which are transparent to light, have interior major surfaces on which are deposited electrodes 12 and 22. Where light is to be transmitted through an electrode, it should be made of transparent material. Voltage sources 40 and 50 are connected to the electrodes to generate an essentially uniform AC electric field $\overline{E}$ across the LC material and essentially perpendicular to the plates. Depending on the application, the electrodes may be single board area layers (e.g., in optical modulators) or an array of stripes (e.g., in a multiplexed display).

if the device is used as a display, an arrangement for matrix addressing or multiplexing may be provided in which the electrodes are patterned to form arrays of closely spaced stripes, with the two arrays being oriented transverse (e.g., perpendicular) to one another. Thus, the LC volume in the region of overlap of each pair of stripes defines a picture element (pel). However, because the flexoelectric effect is linear, the LC material exhibits no switching threshold; so to be effective in providing contrast the cell could incorporate a well-known nonlinear component (e.g., a thin-film transistor (TFT) or metal-insulator-metal (MIM) device) in series with each pel.

The individual pels are selectively addressed by means of suitable electronic switching circuitry incorporated into sources 40 and 50. For simplicity, only two connections to each array are shown. The sources 40 and 50 apply suitable voltages across selected electrodes, thereby applying an electric field $\overline{E}$ across a preselected pel.

Means for providing optical contrast of light 65 transmitted into and out of the cell illustratively includes polarizers 60 and 70 formed on the glass plates 13 and 20. The polarizers may be oriented parallel or at an angle to one another depending on the application.

When used in the common reflection mode, the cell is also provided with a reflector (not shown) which reflects light transmitted through the cell for retransmission out of the viewing surface.

In order to align the molecules of the LC material 30 so that the helix axis is essentially parallel to the plates, the cell is illustratively provided with a pair of aligning layers 80 and 90 on the interior surfaces of the cell. Alignment can be effected using the surface treatment described by J. S. Patel et al in *Ferroelectrics*, Vol. 59, p. 129 (1984) and, for example, by cooling the LC material from an isotropic phase to a cholesteric phase in the presence of an electric field. In one embodiment, these aligning layers cover at least the electrodes in the regions where the electric field is applied to the LC material. Illustratively, the layers 80 and 90, as shown, cover the electrodes 12 and 22 as well as the interstitial spaces therebetween.

Figure 7:
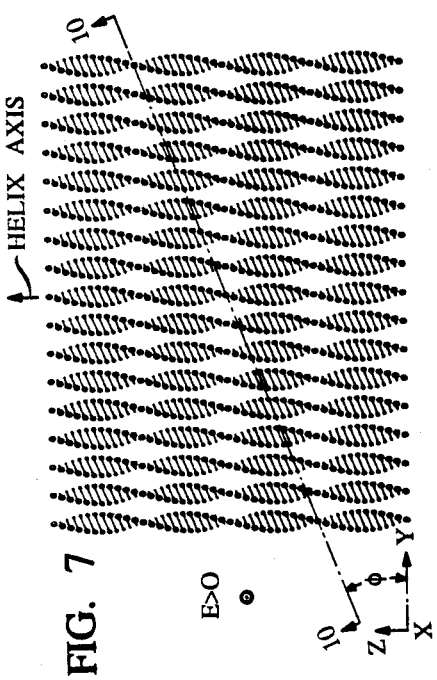
FIGS. 7-9 are schematic top views of LC molecules in which the directors rotate in space along a helix whose axis is essentially parallel to the plates of cell.
Figure 8:
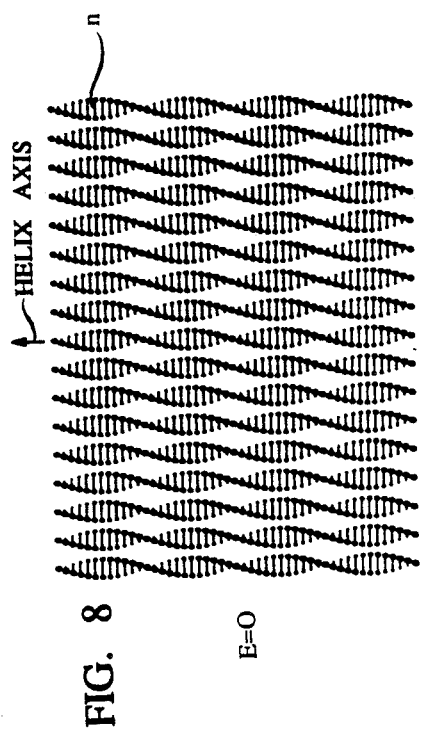
Figure 9:
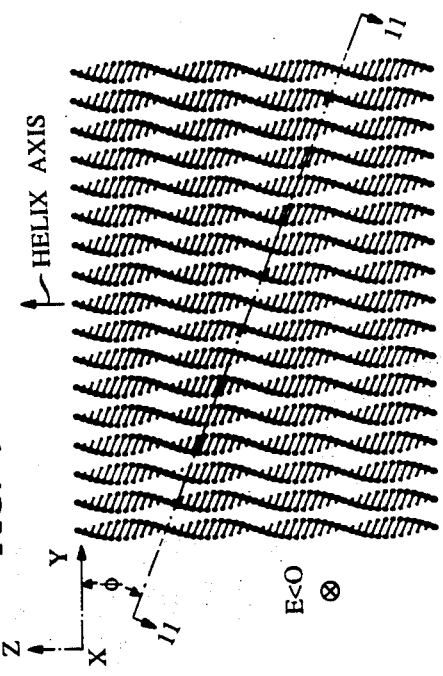
Figure 8:
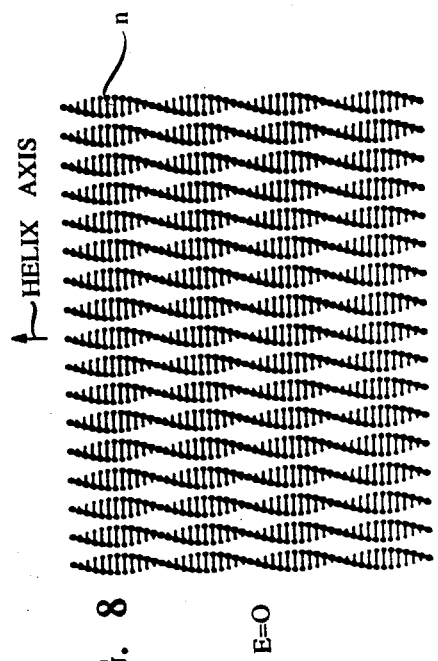

In accordance with one aspect of the invention, the LC molecules form a helix (FIGS. 6-9) in which the helix axis is essentially parallel to the plates. In the absence of an electric field (E=0; FIG. 8) the directors $\overline{n}$ of the molecules are oriented essentially perpendicular to the helix axis. However, in the presence of a positive field (E>0; FIG. 7) applied essentially perpendicular to the plates, the planes of the directors rotate about the field direction by an angle $\phi$ to the helix axis, and, conversely, in the presence of a negative field (E<0; FIG. 9) of the same magnitude the directors rotate by an angle $-\phi$ to the helix axis.

Figure 10:
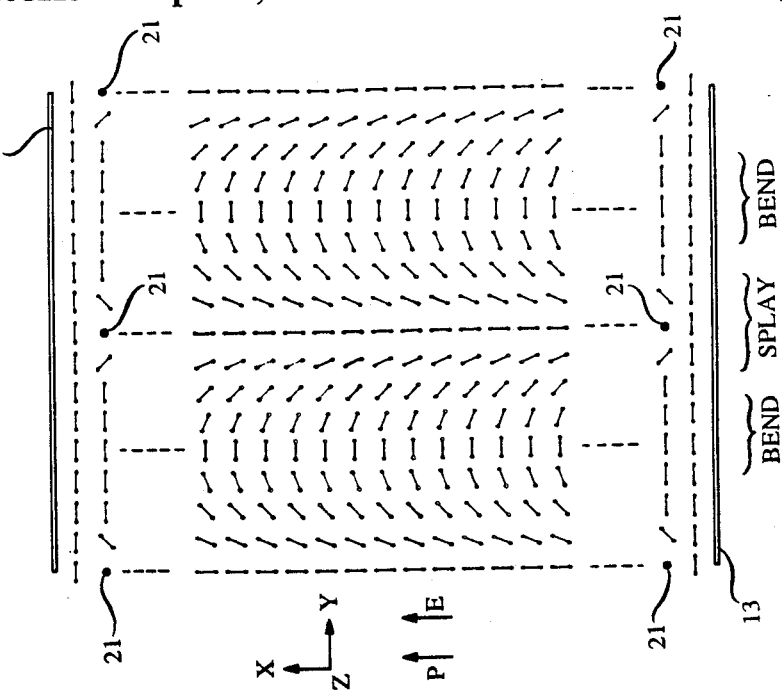
FIGS. 10 and 11 are cross sections along lines 10—10 and 11—11 of FIGS. 7 and 9, respectively.
Figure 11:
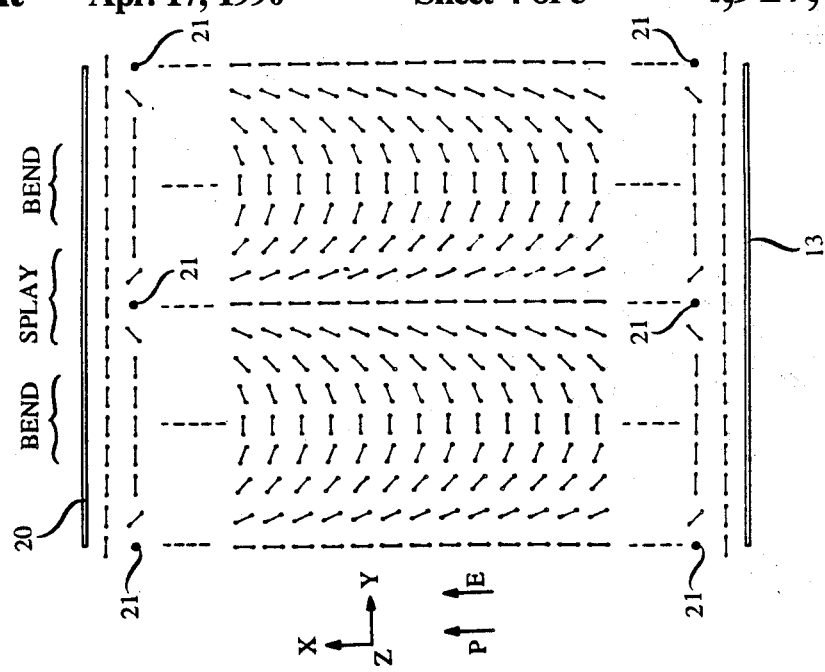
Figure 12:
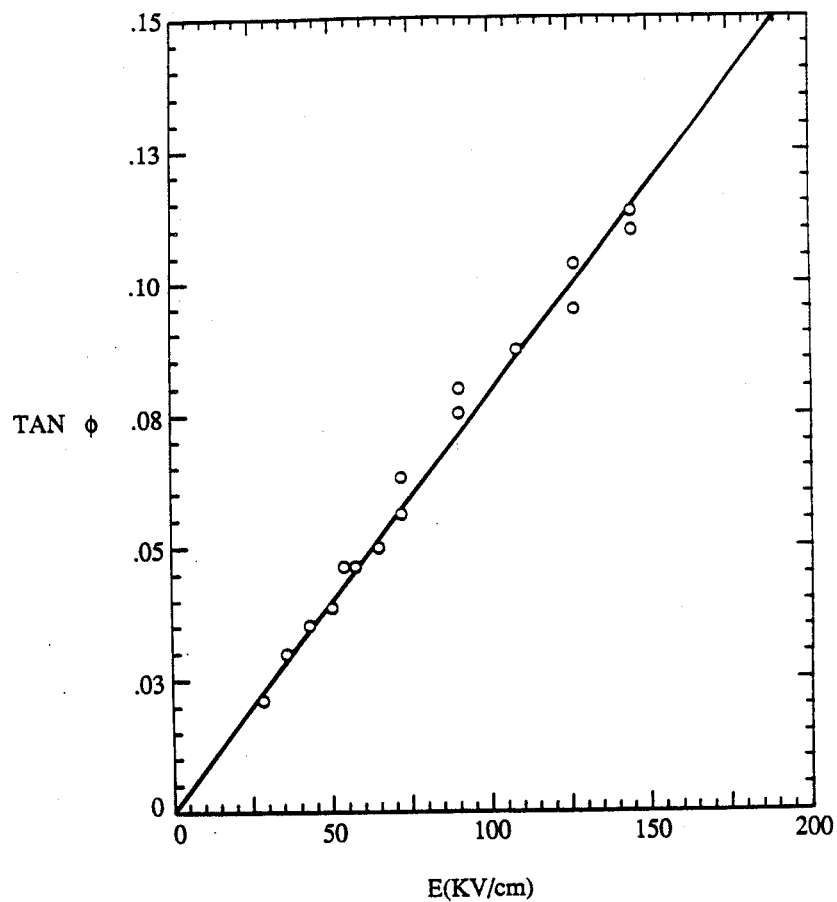

The magnitude of the field is chosen to be low enough that any coupling to the dielectric anisotropy of the LC material does not cause unwinding of the cholesteric helix. Under these circumstances, the molecules exhibit deformation characterized by alternating (e.g., periodic) band of splay and bend as shown in FIGS. 10 and 11. These figures are cross sections taken along lines 10—10 and 11—11 of FIGS. 7 and 9, respectively; that is, cross sections formed by planes perpendicular to the plane of the helix and at $\pm \phi$ to the y-axis (director orientation at E=0). This deformation gives rise to a flexoelectric effect in which the magnitude of the electric field is linearly related to tan $\phi$ as shown in FIG. 12.

Disclinations 21 shown in FIGS. 10-11 are inherently formed at locations which are near the surfaces of plates 13 and 20 and where the directors in the bulk of the LC material are orthogonal to those at the surfaces. For example, in FIGS. 10-11 disclinations 21 are located near the surfaces of plates 13 and 20 and at the centers of the splay bands. As noted earlier, the fact that high electric fields are not required to create the disclinations means that the invention can operate using relatively low magnitude fields.

Associated with the alternating bands of splay and bend deformation are separate flexoelectric coefficients $e_s$ and $e_b$, respectively. The average of these coefficients is designated $e_{av}$. In order to increase the flexoelectric effect it is desirable to utilize materials in which $e_s$ and $e_b$ are of the same sign and are relatively large. In this regard, the effect is also increased in materials in which the pitch $p_o$ at E=0 of the helix is larger, as long as the helical structure remains. That is, to a first order approximation, tan $\phi = e_{av} p_o E / 2\pi K$, where K is a constant related to the splay, twist and bend elastic constants, $K_1, K_2$, and $K_3$ respectively. However, a trade off occurs in that a smaller $p_o$ may be desirable in some applications (e.g., in a display or an optical grating).

EXAMPLE I

This example describes an experiment in which the flexoelectric effect was observed in a cholesteric LC material comprising S-4-n-nonyloxyphenyl 4-(3',7'-dimethyloctyloxybenzoyloxy)benzoate. The LC material was contained in a cell which was approximately 2.75 $\mu$m thick and which had indium-tin oxide electrodes deposited on glass plates and coated with poly-1-4-butyleneterephthalate to produce parallel molecular alignment at the surfaces. Alignment followed the technique described by J. S. Patel et al, supra. Initial alignment of the helix axis parallel to the glass plates was achieved by cooling the sample from the isotropic state (about 130° C.) in the presence of an electric field. Because this material has a positive dielectric anisotropy, this orientation of the helix had the lowest dielectric energy. The cell was placed between crossed polarizers and aligned for extinction in the absence of an electric field. Measurements of the effect were then made by applying a 40 Hz square wave of variable amplitude across the electrodes and by monitoring the transmitted light intensity with a photodiode and an oscilloscope. For each field amplitude the cell was rotated clockwise and counterclockwise to find the extinction angles for each polarity of field. The dependence of rotation angle on field was found to be linear (FIG. 12) up to the field at which the dielectric coupling resulted in unwinding the helix. Using the equation for tan $\phi$ given earlier and the value of the slope in FIG. 12, it was found that $e_{av}=3\times10^{-5}$ cgs units, using $K=1\times10^{-6}$ dynes and a helix pitch $p_o=0.5$ μm.

EXAMPLE II

Using the same alignment procedures as in Example I, but a cell thickness of 2.0 μm, the flexoelectric effect as described above was observed in a mixture of 0.264 gm of a nematic LC material designated 2141-100 (EM Chemicals, Hawthorne, N.Y.; E. Merck, Darmstadt, W. Germany) and 0.0713 gm of cholesteryl nonanoate.

EXAMPLE III

In an effort to attain an LC material with a tighter pitch, Example II was repeated using 0.2746 gm of the nematic LC 2141-100 and 0.009819 gm of cholesteryl nonanoate. Again, the above flexoelectric effect was observed.

EXAMPLE IV

The above flexoelectric effect was also observed in a mixture of 0.152 gm of a nematic LC material designated K15 (EM Chemicals and E. Merck companies, supra) and 0.025 gm of cholesteryl nonanoate.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, alternating bands of splay and bend may be induced in LC material by applying an essentially uniform field across the plates and by providing the surface of at least one of the plates with aligning layers comprising periodic zones (e.g., stripes) of essentially homogenous and essentially homeotropic material. When the LC material has a helical structure, the period of the zones should be essentially equal to the pitch of the helix.

What is claimed is:

1. A liquid crystal device comprising
   a cell containing a liquid crystal material (30) and including a pair of essentially parallel plates (13, 20), at least one of which is transparent to light made incident thereon, electrode means (12, 22) on said plates for applying an electric field (E) across said plates in a direction essentially parallel to the direction of said light, and means (80, 90) for aligning the molecules (15) of the material along a predetermined direction,
   characterized in that:
   the directors (n) of said molecules form a helix in which the helix axis is essentially parallel to said plates and perpendicular to the direction of said field, and
   said applying means generates an electric field which does not unwind said helix but which causes the planes of said directors to change their orientation relative to said helix axis.
2. The device of claim 1 wherein said material comprises a cholesteric liquid crystal.
3. The device of claim 1 wherein said material comprises a chiral nematic liquid crystal.
4. The device of claims 1, 2, or 3 wherein said field applying means causes the planes of said directors to rotate about the direction of the field by an angle $\phi$ relative to the helix axis, and wherein tan $\phi$ is linearly related to the magnitude of the field.
5. The device of claim 4 wherein the magnitude of the electric field is sufficient to induce alternating periodic bands of splay and bend in the molecules of said material.
6. The device of claim 4 wherein said applying means cause the planes of said directors to rotate by an acute angle 100.
7. A liquid crystal device comprising
   a cell containing a liquid crystal material (30) and including a pair of plates (13, 20) at least one of which is transparent to light made incident thereon, electrode means (12, 22) on said plates for applying an electric field (E) across said plates in a direction essentially parallel to the direction of said light, and means (80, 90) for aligning the molecules (15) of the material along a predetermined direction,
   characterized in that:
   said electrode means applies an essentially uniform field across said plates, and
   said field and said aligning means induce periodic bands of splay and bend in said liquid crystal material.
8. The device of claim 7 wherein said aligning means comprises aligning layers on at least one of said plates, said aligning layers including periodic zones of essentially homogeneous and essentially homeotropic alignment material.
9. The device of claim 8 wherein said liquid crystal material has a helical structure and the period of said zones is essentially equal to the pitch of said helical structure.

* * * * *